July 23, 1968

D. MILLER ET AL 3,393,804

HOT PROCESS SETTLING TANK

Filed April 10, 1967

INVENTORS
DURANDO MILLER, JR.
GEORGE APFEL

BY *Theodore B. Roessel*

ATTORNEY

July 23, 1968   D. MILLER ET AL   3,393,804
HOT PROCESS SETTLING TANK
Filed April 10, 1967   2 Sheets-Sheet 2

INVENTORS
DURANDO MILLER, JR.
GEORGE APFEL
BY
Theodore B. Roessel
ATTORNEY

United States Patent Office 3,393,804
Patented July 23, 1968

3,393,804
HOT PROCESS SETTLING TANK
Durando Miller, Mount Kisco, N.Y., and George Apfel, Ramsey, N.J., assignors to Ritter Pfaudler Corporation, Rochester, N.Y., a corporation of New York
Filed Apr. 10, 1967, Ser. No. 629,526
6 Claims. (Cl. 210—177)

ABSTRACT OF THE DISCLOSURE

A hot process settling tank with a spherical outer shell, the tank having a conical baffle arranged within the spherical shell to define an upflow zone of increasing cross sectional area where solids are precipitated from upflowing water. The baffle and spherical shell together define a generally annular space therebetween which, in one embodiment of the invention, is filled with fluid to eliminate any differential pressure across the baffle caused by the weight of fluids and solids in the upflow zone. In another embodiment of the invention, the annular space provides a storage for backwash water, circulation of backwash water in the annular space being removed from the path of normal flow through the tank to prevent surge and expansion of the sludge blanket within the hot process settling tank during backwashing.

---

This invention relates to settling tanks and more specifically to a spherical design for relatively large hot process settling tanks.

Hot process settling tanks are well known in the water treatment art and are especially useful in the treating of boiler feed water for the protection of steam generating apparatus. Such tanks in the prior art are generally cylindrical in nature, having a dished top head and a conical bottom head. Water to be treated is sprayed into the top of the tank and through a space containing steam. Softening chemicals are then added to the water to react with the calcium, magnesium and iron dissolved in it to form precipitates which are then removed by sedimentation. The heating of the water achieved by the aforesaid spraying through steam results in a high degree of efficiency because the softening chemicals react more rapidly and effectively in boiling water. The heated water and softening chemicals then flow downwardly through a conduit to the apex of the conical bottom head and upwardly through a sedimentation compartment defined by the conical bottom. Conical bottoms are used to gradually increase the cross sectional area of the upflow zone so that the rate of upflow is gradually decreased. This decreasing rate of upflow aids in forming the precipitates into a suspended sludge blanket, a portion of which is periodically removed from the sedimentation compartment through a bottom located outlet. Water treated in such a manner can then be further treated in downflow filter and ion exchangers to achieve the degree of purity desired.

Having a conical bottom attached to the cylindrical body presented several fabrication problems when constructing large containers which may be greater than 40 feet in diameter. For example, the weight of the contents of the tank developed severe stresses in the conical bottom so that very heavy construction was required to prevent rupture. Therefore, it is an object of our invention to provide a design for relatively large hot process settling tanks which eliminates stresses in the conical bottom of the hot process settling tank thereby permitting the use of lighter gauge construction materials.

The optimum configuration for relatively large containers of any kind is the sphere because such a figure provides the greatest volume for the smallest surface area. In addition, the sphere has no sharp edges or seams where stress can concentrate, thereby providing the strongest structure for the least total weight of construction material. Therefore, it is another object of our invention to provide a spherical hot process settling tank.

Spherical design, however, is not suited for upflow filtration because the spherical shape does not provide the gradual increase in the cross sectional area of the upflow zone necessary to aid the formation of the precipitates into a suspended sludge blanket. Furthermore, sludge would tend to settle towards the sides of the lower portion of the sphere making sludge removal difficult. Therefore, it is a further object of our invention to provide a spherical hot process settling tank having internal structure to gradually increase the upflow area in a manner which facilitates the formation and removal of a sludge blanket.

Providing the internal structure to impart the necessary rate of upflow to form a sludge blanket however, removes a portion of the volume from useful service. Therefore, it is the further object of our invention to provide a spherical hot process settling tank in which that portion of the volume removed from service by the internal structure is used for storage thereby minimizing the amount of wasted space.

In cylindrical hot process settling tanks a substantial depth of clarified water is stored above the sludge blanket. This storage provides sufficient water to permit backwashing the downflow filters, normally associated with hot process settling tanks, at a high rate of flow. However, this storage is in the normal path of flow through the tank so that care must be taken during backwashing to insure that the sludge blanket does not expand into the treated water outlet and into the filters. Therefore, it is a still further object of our invention to provide a spherical hot process settling tank in which expansion of the sludge blanket during backwashing is prevented by providing a storage for backwash water which is removed from the normal path of flow through the tank.

These and other objects, advantages and characterizing features of our invention will become more apparent upon consideration of the following detailed description thereof when taken in conjunction with the accompanying drawings in which.

The hot process settling tank constructed in accordance with our invention can be characterized in one aspect thereof by the provision of a generally spherical shell, a partition dividing the volume of the spherical shell into an upper reaction compartment and a lower settling compartment, an upwardly diverging baffle disposed within the spherical shell forming the base surface of the settling compartment and defining the upflow zone of increasing cross-sectional area for gradually decreasing the rate of upflow to permit the formation of a sludge blanket in the settling compartment, the baffle and spherical shell together forming a generally annular space therebetween which may be used as a liquid storage, and a vent associated with the liquid storage to prevent the entrapment of air therein as the storage space fills with liquid.

Figure 1:
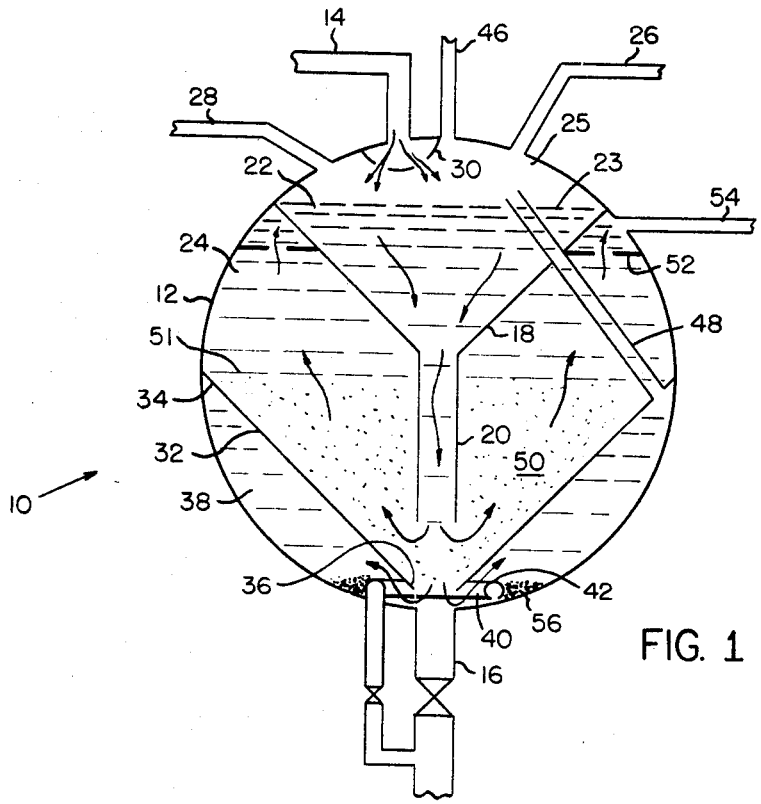
FIGURE 1 is an elevational cross-sectional schematic representation of the hot process settling tank of our invention.

Referring now to the drawings, FIGURE 1 shows a hot process settling tank of our design generally designated at 10 to include a spherical outer shell 12. Shell 12 may be supported by any suitable means (not shown) attached to the shell. Spherical shell 12 includes a top located untreated water inlet 14 and a bottom located sludge removal outlet 16. Located within shell 12 is a funnel 18 having its downcomer 20 terminating above sludge outlet 16. Funnel 18 serves as a partition to divide the tank into an upper reaction compartment 22 and a lower settling compartment 24, which communicate through downcomer 20. Extending through shell 12 and into reaction compartment 22 are a chemical inlet 26 and a steam inlet 28.

Untreated water entering through inlet 14 is sprayed into reaction compartment 22 through a distributor head 30. Distributor head 30 includes a plurality of spray valves (not shown) for discharging the untreated water into reaction compartment 22 in the form of thin conical sheets of water which provides sufficient surface for contact with the steam for heating the water. The water in reaction compartment 22 rises to some level 23 leaving a steam space 25 above the water level through which the untreated water is sprayed for heating.

Also located within shell 12 is an inverted truncated conical baffle 32 which forms the base of settling compartment 24. Baffle 32 has its upper end 34 fixed adjacent a mid-point of shell 12 and its downwardly extending truncated apex 36 terminating above sludge outlet 16. Baffle 32 and spherical shell 12 together define a generally annular space 38 therebetween. Since baffle 32 has its truncated apex 36 terminating above the base of the shell, a generally annular opening 40 is formed therebetween which provides for the free passage of water from settling compartment 24 into annular space 38. An annular blow-off ring 42 is disposed in opening 40 for purposes set out hereinbelow.

In reaction compartment 22, the conical sprays of water passing through steam space 25 are heated by steam entering through inlet 28 and mixed with chemicals entering through inlet 26. The added chemicals then react with the minerals dissolved in the heated water to form precipitates. Excess steam, gases produced by the chemical reaction and dissolved non-condensible gases such as oxygen, nitrogen and carbon dioxide driven out of the untreated water by heating, escape from within the tank through a vent 46 at the top of spherical shell 12. After the water to be treated is heated and mixed with chemicals in reaction compartment 22, it passes downward through funnel 18 and downcomer 20 into settling compartment 24. Water flowing into settling compartment 24 also passes through opening 40 and into annular space 38. The water level in annular space 38 rises with the water level in settling compartment 24 until annular space 38 is filled. Air entrapped at the top of annular space 38 by the rising water level escapes through a vent pipe 48 which extends above the water level 23 in reaction compartment 22 and into steam space 25.

Filling annular space 38 with liquid eliminates any differential pressure across baffle 32, which frees the baffle from the task of supporting the contents of settling compartment 24. That is, the sole function of baffle 32 in the embodiment shown in FIGURE 1, is to define an upflow zone of increasing cross sectional area for gradually diminishing the rate of fluid flow through the upflow zone. Since baffle 32 does not perform a support function, it can be a thin walled member made from relatively light weight material which would not otherwise be capable of supporting the weight of the contents of settling compartment 24.

As the water flows upwardly through settling compartment 24, the precipitates resulting from the chemical reaction form a sludge blanket 50 which fills part of the lower portion of the volume contained with conical baffle 32 to a desired level indicated at 51. Sludge blanket 50 effectively reduces silica and filters out the bulk of turbidity from the upflowing water. Clarified water then rises to a collector ring 52 adjacent the top of funnel 18 and exits out a line 54 to either a point of use (not shown) or to a point of further treatment as set out hereinbelow. Care should be taken in controlling the rate of upflow through sludge blanket 50 to prevent the sludge blanket from also rising to collector ring 52 and out line 54. Sludge which accumulates in settling compartment 24 is periodically discharged therefrom through outlet 16 to hold the sludge blanket at the desired level 51.

While water will freely circulate from reaction compartment 22 through downcomer 20 and upward through settling compartment 24, little or no circulation of water will take place in annular space 38. Precipitates and other undissolved material contained by the water in annular space 38 will settle and collect as sediment along the lower portion of the sphere forming a thin sludge layer indicated at 56 which is periodically removed through blow-off ring 42.

As an alternative to venting annular space 38 to steam space 25, it is also possible to vent the annular space directly to settling compartment 24 through the upper end 34 of baffle 32. However, this arrangement would increase the circulation through annular space 38 resulting in a greater amount of sludge being carried into that area. Thus in the embodiment of our invention as shown in FIGURE 1, it is preferred to have the upper end 34 of the baffle attached to shell 12 to minimize the circulation through annular space 38. In either arrangement, annular space 38 will fill with water which eliminates the pressure differential across conical baffle 32 and allows the baffle to be made from relatively thin material.

Figure 2:
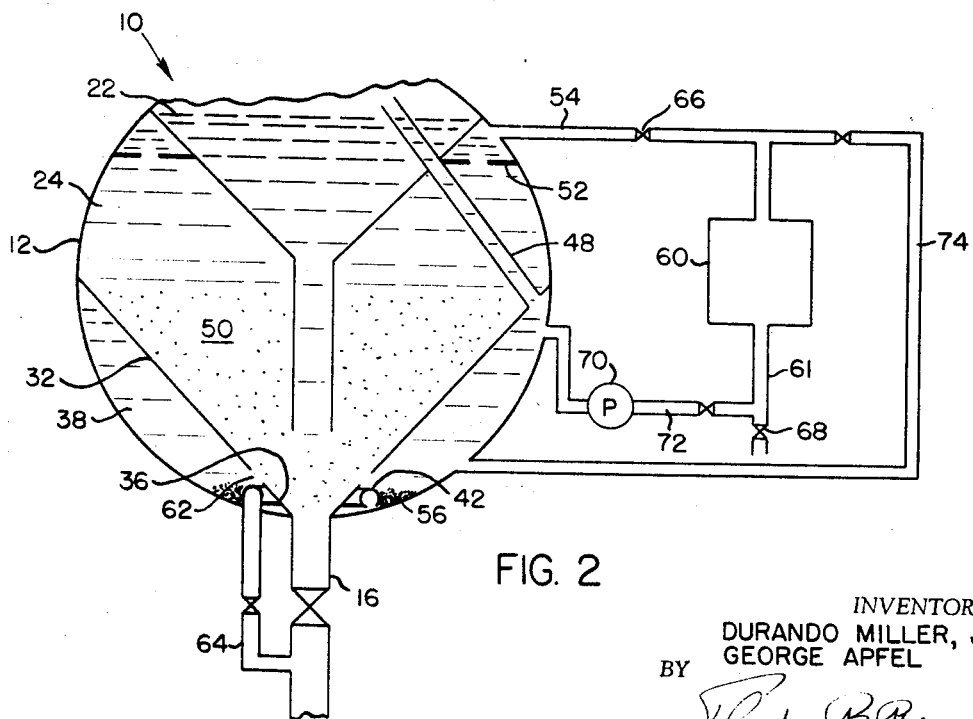
FIGURE 2 is similar to FIGURE 1, partly broken away and showing another embodiment of the invention.

Merely filling annular space 38 with water to balance the weight of the water and the sludge within settling compartment 24 removes a portion of the volume of spherical shell 12 from useful service. Therefore, a second embodiment as shown in FIGURE 2 utilizes annular space 38 for the storage of water which can be used at later stages of operation. In referring to the embodiment shown in FIGURE 2, like elements have been given like reference numerals.

As stated hereinabove, treated water rising to collector ring 52 is removed through line 54 to a point of further treatment. For example, this water can be passed through one or more downflow filters 60 to remove any particles of suspended matter carried over from settling tank 10. For purposes of illustration, FIGURE 2 shows a single downflow filter unit but it should be appreciated that this is only a representation of the multiplicity of filters normally used with relatively large hot process settling tanks. Filtered water passing through downflow filters 60 and out discharge line 61 can be further treated in ion exchangers (not shown) to remove the last traces of scale forming contaminants. During the operation of the apparatus, it is necessary to periodically clean downflow filters 60 by backwashing with clean backwash water at a rate of flow much higher than the normal flow rate of the hot process settling tank. Therefore, if clean backwash water were drawn from the normal flow through the settling tank, a surge or sudden increase in the flow rate would develop. This would expand the sludge blanket 50 to the level of collector ring 52 so that parts of the sludge blanket are carried over into the filters. However, adapting annular space 38 to store clean backwash water and then drawing water from this storage to backwash downflow filters 60 removes the backwashing flow from the normal flow through the tank and prevents a surge through the tank during backwashing.

While the embodiment of FIGURE 1 will permit annular space 38 to store backwash water, it is preferred to modify the apparatus as shown in FIGURE 2 by fixing the truncated apex 36 of the baffle 32 to spherical shell 12 about sludge outlet 16. Several openings 62 are provided in baffle 32 adjacent apex 36 to permit water from settling compartment 24 to enter the annular space 38. When annular space 38 is filled with water, little or no circulation occurs so that precipitates resulting from the chemical action and other undissolved material can settle to the base of shell 12 and accumulate as a sediment layer 56. This sediment layer is then removed periodically through blow off ring 42 and drain 64.

When it becomes necessary to backwash one of the filters 60, valves 66 and 68 in lines 54 and 61 respectively are closed to stop downflow through the filter to be backwashed. The clarified water in annular space 38 above sediment layer 56 is then pumped by pump 70 through line 72 to backwash the filter. Dirty backwash water which exits from the top of the filter is recirculated through line 74 back to the annular space 38. Since the withdrawal rate and return rate of the backwash water are identical, the fluid contents of settling compartment 24 does not flow into annular space 38 and surge through the tank during backwashing is prevented. The identical withdrawal and return rate also prevents a reduction in volume of liquid in annular space 38 and therefore, as in the embodiment of FIGURE 1, a pressure differential across baffle 32 is avoided. When one of the filters 60 has been backwashed, the water in annular space 38 is allowed to stand until the backwashed material settles to re-establish the sediment layer at 56 which is then removed through blow off ring 42 and drain 64. This allows reclarification of the water in annular space 38 so that it can be reused when backwashing is again necessary.

Figure 3:
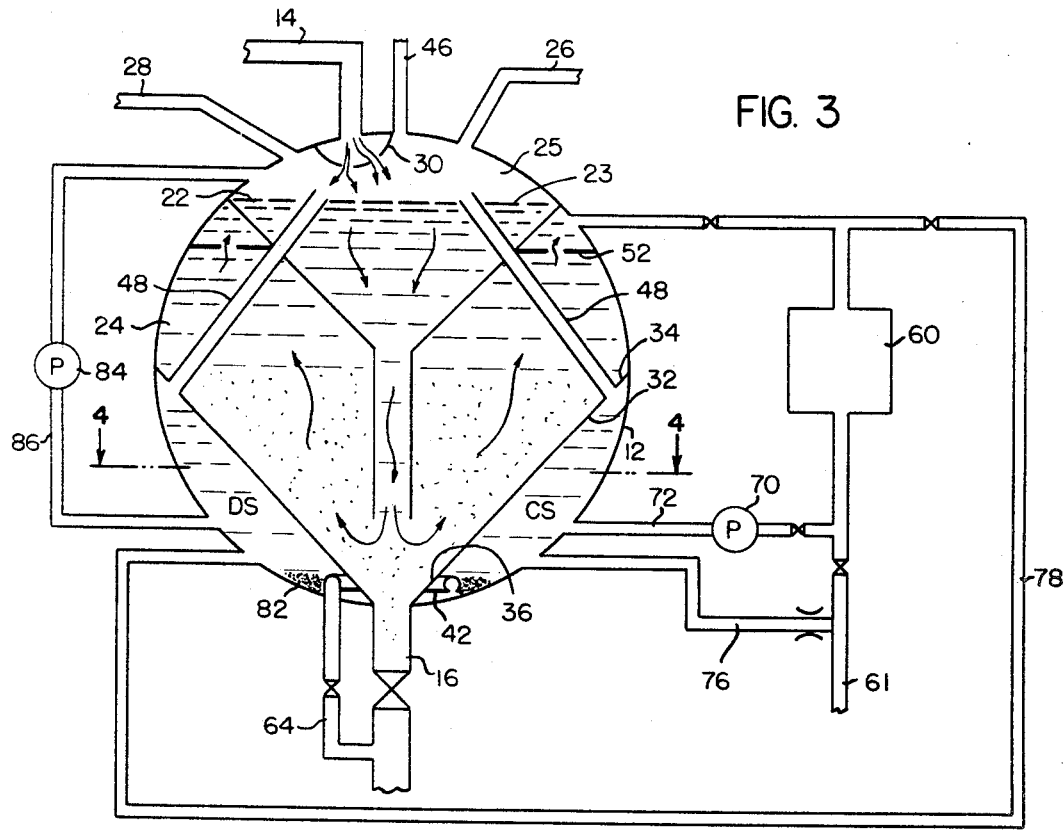
FIGURE 3 is similar to FIGURE 1 showing still another embodiment of our invention.
Figures 4, 5:
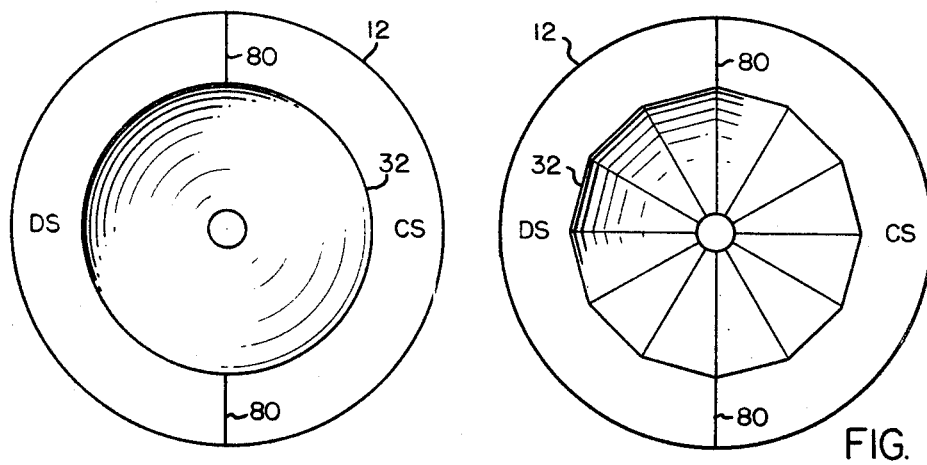
FIGURE 4 is a view taken along the lines 4—4 of FIGURE 3.
FIGURE 5 is a view similar to FIGURE 4, showing another embodiment of the invention.

In the embodiment shown in FIGURES 3 through 5, no provision is made for having the annular space between baffle 32 and spherical shell 12 communicating with settling compartment 24. In this respect, baffle 32 has its upper end 34 fixed adjacent a midpoint of shell 12 and its truncated apex 36 fixed to the shell about sludge outlet 16. As shown in FIGURES 4 and 5, the annular space between shell 12 and baffle 32 can be divided by wall members 80 into two water-tight compartments, a clean backwash storage CS and a dirty backwash storage DS.

In operation, clean backwash storage CS is filled at a slow rate by treated water bled from filter discharge line 61 through a bleed line 76 and into storage CS. When backwashing is necessary, pump 70 draws water from clean backwash storage CS through line 72 to backwash one of the filters 60. Dirtied backwash water then exits from filter 60 passing through line 78 and into the dirty backwash storage DS. Here the dirty backwash water is allowed to stand until material removed by backwashing can settle to the bottom of the storage and collect as a sediment layer 82 which is periodically removed from storage DS through sludge blow off ring 42 and drain 64. After backwash water has been clarified by settling, it is pumped by a pump 84 from storage DS through line 86 to re-enter the reaction compartment 22 for recirculation through the system. In this embodiment, it is obvious the clean backwash storage CS and dirty backwash storage DS will at times be empty or practically empty so that conical baffle 32 must be designed to withstand the pressure of the water and sludge blanket in settling compartment 24. It is also obvious in this embodiment that each storage compartment must be provided with a vent 48 to permit air entrapped in each compartment to escape to the reaction compartment 22. Furthermore, it should also be obvious in this embodiment that it is possible to add additional compartments, for example, for storing zeolite softened water.

Note that as shown in FIGURE 5, baffle 32 need not necessarily be conical, but can be pyramidal in shape having many sides. The pyramidal baffle has the advantage of being easier to fabricate than a conical baffle since the sidwalls can be made from flat plates, whereas the conical baffles must be rolled into shape. The conical baffle, however, has the advantage of being easier to seal against the spherical wall of shell 12.

Thus, it will be appreciated that the present invention accomplishes its intended objects, providing a design for hot process settling tanks which lends itself to the construction of relatively large efficient spherical units. The spherical construction provides the greatest volume and strength for the least weight of construction material while the internal baffle arrangement provides the necessary upward diverging design to facilitate the formation and removal of the sludge blanket.

By utilizing the area between the baffle and the spherical shell for storing backwash water, the entire volume of the shell is in use which increases the efficiency of the design and removes the path of backwash water flow from the normal path of flow through the tank which in turn prevents the expansion of the sludge blanket during backwashing.

When we have described the preferred embodiment of our invention, it will be readily apparent that various modifications can be made therein without changing the spirit and scope of the invention as set out in the appended claims. Having thus described our invention in detail, what we claim as new is:

1. A settling tank for precipitating dissolved and suspended matter from chemically treated water comprising:
 (a) a substantially spherical outer shell having a clarified water outlet in the upper portion thereof and a sludge removal outlet in the lower portion;
 (b) means for discharging chemically treated water into the lower portion of said spherical shell;
 (c) an upwardly diverging baffle within the lower portion of said sphere defining an upflow zone of increasing cross sectional area, said baffle and spherical shell together defining a generally annular space therebetween and the lowermost portion of said baffle being positioned at a level below the lower end of said discharge means, said baffle adapted to direct the flow of said chemically treated water upwardly through said upflow zone at a diminishing rate of flow, whereby precipitated impurities remain as a suspended sludge blanket in said upflow zone as clarified water flows upwardly to said clarified water outlet; and
 (d) means communicating said annular space and said upflow zone, whereby the weight of water and suspended matter in said upflow zone is hydrostatically balanced by liquid in said space.

2. In a hot process settling tank having an inlet for untreated water and an outlet for treated water in the upper portion thereof, a sludge removal outlet in the lower portion, means therein to heat untreated water, a partition dividing the tank into an upper reaction compartment and a lower settling compartment, means for adding water treating chemicals to the untreated water, the chemicals reacting with the impurities in the heated untreated water in the reaction compartment to produce treated water and precipitates, a downcomer depending from the partition for discharging the treated water and precipitates from the upper reaction compartment downwardly into the lower settling compartment, the improvement comprising:
 (a) a substantially spherical outer shell constituting said tank;
 (b) an upwardly diverging baffle within the lower portion of said spherical shell forming the base of said settling compartment and defining an upflow zone of increasing cross sectional area, the lowermost portion of said baffle being spaced beneath the lower end of said downcomer and said baffle and shell together defining a generally annular space therebetween, said baffle adapted to direct the downflow of said treated water and precipitates from said downcomer upwardly through said upflow zone at a diminishing rate of flow, whereby said precipitates separate from said treated water as the treated water flows upwardly to said treated water outlet; and (c) means to feed treated water to said annular space for providing hydrostatic pressure to balance the weight of the contents of said settling tank on said baffle, whereby said hydrostatic pressure prevents the collapse of said baffle under the weight of the contents of said settling compartment.

3. A hot process settling tank as set forth in claim 2 in which said upwardly diverging baffle is an inverted truncated cone having the upper edge thereof fixed to said shell adjacent a midpoint thereof.

4. A hot process settling tank as set forth in claim 3 in which a sludge removal means is provided in said annular space adjacent the lower portion thereof to remove precipitates settling out of said treated water in said annular space and accumulating on the lower portion of said spherical shell.

5. A hot process settling tank as set forth in claim 3 in which said baffle has its downward extending truncated apex fixed to said shell surrounding said sludge removal outlet.

6. A settling tank for precipitating dissolved and suspended matter from chemically treated water comprising:
   (a) a substantially spherical outer shell, having a clarified water outlet in the upper portion thereof and a sludge removal outlet in the lower portion;
   (b) means for discharging chemically treated water into the lower portion of said spherical shell;
   (c) an upwardly diverging baffle within the lower portion of said spherical shell defining an upflow zone of increasing cross sectional area, the lowermost portion of said baffle being below the lower end of said discharge means and fixed to said spherical shell surrounding said sludge removal outlet and the uppermost portion of said baffle being fixed to said shell adjacent a midpoint thereof, said baffle and spherical shell together defining a generally annular space therebetween and said baffle adapted to direct the flow of said chemically treated water upwardly through said upflow zone at diminishing rate of flow, whereby precipitated impurities remain as a suspended sludge blanket in said upflow zone as clarified water flows upwardly to said clarified water outlet;
   (d) a plurality of wall sections dividing said annular space into fluid tight storage compartments;
   (e) vent means located adjacent the upper portion of each storage compartment;
   (f) means for filling one of said storage compartments with treating fluid; and
   (g) means for removing treating fluid stored in said one storage compartment to a point of use outside of said shell and returning used treating fluid to another of said storage compartments.

References Cited
UNITED STATES PATENTS 2,860,786  11/1958  Kittredge _____ 210—207 X REUBEN FRIEDMAN, *Primary Examiner.*

J. DE CESARE, *Assistant Examiner.*